United States Patent
Pethania et al.

(10) Patent No.: US 7,456,997 B2
(45) Date of Patent: Nov. 25, 2008

(54) COLOR MANAGEMENT

(76) Inventors: Allarakhu Pethania, 50 Arle Road, Cheltenham, Gloucestershire (GB) GL51 8JX; Richard Mozley, 44 Hartlebury Way, Cheltenham, Gloucestershire (GB) GL52 6YB ( * ) Notice: Subject to any disclaimer, the term of this patent is extended or adjusted under 35 U.S.C. 154(b) by 707 days.

(21) Appl. No.: 10/275,669

(22) PCT Filed: Apr. 30, 2001

(86) PCT No.: PCT/GB01/01881

§ 371 (c)(1),
(2), (4) Date: Jun. 9, 2003

(87) PCT Pub. No.: WO01/86944

PCT Pub. Date: Nov. 15, 2001

(65) Prior Publication Data

US 2004/0036695 A1 Feb. 26, 2004

(30) Foreign Application Priority Data

May 12, 2000 (GB) ................. 0011506.3

(51) Int. Cl.
*H04N 1/40* (2006.01)
(52) U.S. Cl. ....................................... 358/1.9; 358/504
(58) Field of Classification Search ................. 358/1.9, 358/2.1, 500, 504, 523, 518
See application file for complete search history.

(56) References Cited

U.S. PATENT DOCUMENTS

| | | | |
|---|---|---|---|
| 4,642,680 A | 2/1987 | Yamada | |
| 4,975,861 A | 12/1990 | Fujimoto | |
| 5,583,666 A | 12/1996 | Ellson et al. | |
| 5,606,432 A * | 2/1997 | Ohtsuka et al. | ............. 358/527 |
| 5,710,872 A | 1/1998 | Takahashi et al. | |
| 5,754,184 A | 5/1998 | Ring et al. | |
| 5,801,855 A | 9/1998 | Ohta | |
| 5,982,949 A * | 11/1999 | Ohtsuka | ..................... 382/276 |

* cited by examiner

*Primary Examiner*—Thomas D Lee
*Assistant Examiner*—Stephen M Brinich
(74) *Attorney, Agent, or Firm*—Skinner and Associates

(57) ABSTRACT

A means of encapsulating the effects of global and or selective color changes into a multidimensional LUT designed to carryout a specific color space transformation to an image is described.

1 Claim, No Drawings

COLOR MANAGEMENT

At the heart of modern technologies for digital colour management in the prepress, printing and publishing world, the International Color Consortium (ICC) has established standards for handling, colour workflow through a system of 'ICC Profiles'. Developed by the ICC and introduced in 1995, a profile is a standard file format that communicates the measured colour output of a system or device in response to a known input. Its data describes a device's characterisation to computer applications and operating systems that support the format.

By calibration of each system or device, the characteristics of each may be mediated to provide accuracy and consistency in the colour workflow. Before ICC profiling technology, such work could be undertaken only by highly experienced and skilled operatives and at considerable cost in time, resources and manpower.

In a typical colour workflow system, input devices range from digital cameras to scanners, output devices from four-colour process proofers and printing presses to the worldwide web and the internet. In between sits a computer with its monitor display, operating system and software applications. Once all these displays and devices have been profiled, digital colour management is transparent and automatic to all users, wherever they may be in the colour publishing process.

In the background, the processes are complicated by other standards. For example, the output of scanners and the display of a colour monitor conform to the RGB Colour Space model (Red, Green, Blue). Printers and proofers utilise a four-colour process, which uses another Colour Space called CMYK corresponding to the ink colours—Cyan, Magenta, Yellow and Key (Black). These standards can vary from manufacturer to manufacturer.

CIE L*a*b* is a three-dimensional, mathematical colour model based on human sensitivity to the visual spectrum of light; L*=lightness, a*=red-green axis of the Space, b*=blue-yellow axis of the Space. CIE L*a*b* is an international standard developed by the Commission Internationale de l'Eclairage and is the reference model used by computers to mediate between RGB and CMYK. For simplicity of notation, CIE L*a*b* is often abbreviated to Lab.

A Colour Management Module (CMM) is a colour transformation algorithm that accepts colour data and translates it to another Colour Space referencing colour profiles. Each Colour Space has its own three-dimensional range of colour coordinates that mathematically define the hues and shades a device can print or display.

An image data file in the colour workflow is usually given an input profile, which describes the characteristics of the input device (scanner, digital camera) that created the image, and an output profile, which references the characteristics of the output device (printer, proofer). In this workflow, the image data itself remains unchanged. What happens is that the RGB data from the input device is translated to the known CIE Lab standard via the input profile. The Lab data can now be output to any printer via its corresponding output profile or displayed on any monitor via its corresponding monitor profile. The data should be displayed correctly on the monitor and output correctly on the printer. For example, using this workflow, the data should look the same on two different monitors, wherever they are located.

Unfortunately there have been problems. The Lab colour Space is both theoretical and abstract; as such it is difficult for today's technicians to visualise and comprehend, because they are more familiar with (e.g.) RGB and CMYK. The outcome can lead to confusion and give inconsistent results.

Moreover, the interpretation of the standard varies between different makes of colour management software with an observable tendency to produce inconsistent results. Colour management systems are complex and traditional technicians have little experience of the new concepts, how they work in the background and what actions they need to perform to make them work properly. Hence there is a need for tools which are more familiar and easier to use. Such tools must also satisfy ICC requirements.

Generally, profiles have been created in a laboratory/artificial environment and, when used in practical situations, may not give the results that the user wants.

In the case of ICC, the detail of the method is concerned with carrying out Colour Space transformations and producing and editing profiles.

The invention is essentially concerned with building colour space transformations that include the results of modifications (termed 'edits') to colours in an image. These edits are required to compensate for input devices, output devices and image appearance. In this invention, the edits are handled in colour spaces such as RGB or CMYK, which are familiar to users of colour management. The method used allows the results of the editing process to be accurately represented by the transformation so that the user is assured of the appearance of the final image. The transformation can be defined by lookup tables, usually of the multi-dimensional type.

The objective of the invention is to maintain the speed and standardisation advantages of the ICC (International Color Consortium) approach to colour management, whilst retaining the advantage of familiarity for the user by working in the RGB and CMYK colour spaces. The basic method can be used for other familiar colour spaces such as Hexachrome or HiFiColour. The ease of use and flexibility of this invention should encourage wider use of the ICC standard.

The invention can be incorporated into a colour management system and used to produce consistent colours across a variety of reproduction devices.

DEFINITIONS

In the following description, the terms mentioned below are intended to have the following meanings:

Start Space (S space) is the colour space in which the image data is defined at the beginning of the colour management process e.g. RGB data from an input device, or CMYK, Hexachrome, etc. data from a previous process where the data was destined for an output device.

Intermediate Space (I space) is the theoretical colour space used for transportation between devices and also used for gamut mapping. E.g. Lab, XYZ.

End Space (E space) is the colour space used for data at the end of the colour management process, e.g. RGB, CMYK, Hexachrome, etc. data produced for a particular output device.

Grid Points are equally spaced reference points in a colour space. Transformation may be a mathematical transformation or defined as a look up table.

LUT is a lookup table which converts an input value to an output value. It would contain 256 entries for 8-bit data and 65536 entries for 16-bit data.

MLUT is a multidimensional table which converts input values to output values when the input and output data spaces have more than a single dimension, RGB having three dimensions and CMYK four. Exact conversion is not feasible due to the large number of entries that would be required so each dimension is represented by a line of equally spaced grid points(usually 9, 17, 33 or 65 in number) covering the range of values, and specific output values are calculated using interpolation of the adjacent grid points. The accuracy of the representation of the edits improves as the number of grid points increases.

AtoB tramsformation converts data from S space to I space. An AtoB can be defined by:

(a) A multidimensional look up table, MLUT, where grid points in S space are associated with values in I space. Image data is then converted by means of interpolation.

(b) An ICC profile which includes S space input curves and I space output curves (for single channel transformations) as well as the MLUT (for multi-channel transformations).

BtoA transformation converts data from I space to E space. A BtoA can be defined by:

(a) A multidimensional look up table, MLUT, where grid points in I space are associated with values in E space. Image data is then converted by means of interpolation.

(b) An ICC profile which includes I space input curves and E space output curves (for single channel transformations) as well as the MLUT (for multi-channel transformations).

BtoB transformation modifies data from I space to I space. A BtoB can be defined by:

(a) A multidimensional look up table, MLUT, where grid points in I space are associated with values in I space. Image data is then modified by means of interpolation.

(b) An ICC abstract profile which includes I space input curves and I space, output curves (for single channel transformations) as well as the MLUT (for multi-channel transformations).

Global edits are colour changes that are applied to all colours in the image data in accordance with the editing algorithm being used. These are specified in S space and /or E space.

Selective colour edits refer to changes to a narrow range of colours, in S and/or E space.

Regional Selective colour edits are essentially multiple selective edits where the selected colours would be specified by a user/process defined region of the image in S and/or E space.

STRANS is a generic term for a colour transformation from S space to I space. For instance, not all RGB spaces are identical although they are similar and this means that specific transformations are required, e.g. from sRGB to LAB space.

$STRANS^{-1}$ is a generic term for a colour transformation from I space to S space. It may represent a transformation which is not the mathematical inverse of the particular transformation used in STRANS but a transformation which takes data back from I space to an S space which is parallel to the original S space of STRANS.

ETRANS is a generic term for a colour transformation from I space to E space. For instance not all CMYK spaces are identical so that a specific transformation would be needed from LAB space to a particular CMYK space.

$ETRANS^{-1}$ is a generic term for a colour transformation from E space to I space. It may represent a transformation which is not the mathematical inverse of the particular transformation used in ETRANS but a transformation which takes data from a parallel E space to I space .

SEDIT is a global editing method for S space.
EEDIT is a global editing method for E space.
SSELECT is a selective colour editing method in S space.
ESELECT is a selective colour editing method in E space.
ISELECT is a selective colour editing method applied in I space but carried out via S or E space coordinates.

Image data can be modified using existing proprietary methods. Input data can be edited using SEDIT or SSELECT at the input device stage, the data remaining in S space. Output data can be modified using EEDIT or ESELECT at the output stage in E space. The advantage of this is that the users are familiar with S and E spaces and have fine control of their colour edits. The major disadvantage is the time taken to process the entire data. Other disadvantages are that S and E space vary from one manufacturer to another and the user is locked into that system, portability not being an option. Its advantages cannot be exploited for the wider market place. Also once the data has being converted by such methods it is usually a one way process because certain assumptions being made, it is difficult to make further changes, without loss of quality.

In the situation where ICC profiles are used in colour management the edits are incorporated into profiles (containing LUTs and MLUTs), these being input, output, colour space transformation, device-link, or abstract profiles.

The main advantages of the ICC approach are standardisation, speed of processing and portability. The main disadvantages are: crudeness of the initial model, limited scope, inflexibility, lack of fine control of editing, uncertainty of the final result and lack of familiarity. This often produces inconsistent results.

The initial model is crude in that the ICC profile is based on a sample target to give a calibrated result. Assumptions are being made that the error is evenly distributed and that the target captures all possible variations. Now in the case where the space is three dimensional, e.g. in scanning, the representation will be reasonable, but in the case where there are four or more dimensions, e.g. in printing, only one solution is obtained out of the many possible, and this may not be the best solution.

The scope and flexibility is limited in that once the information is digitised into a profile it can be edited but only within the domain of the profile. The ability of the profile to accurately represent the information depends on the number of grid points chosen, the more the grid points the better the accuracy. Many profiles created use only 17 grid points which restrict the accuracy you can obtain. You cannot get any more out of the profile, you can contract the profile but cannot expand it. The current editing methods cannot be fully exploited because the information is restricted to the finite number of grid points used to represent the profile.

Using the traditional proprietary method you can control the colour changes to a very precise manner whereas with profiles only the grid points are changed, other colours being interpolated, so you cannot make a precise change. In profiles with as few as 9 or even 17 grid points the effect of the change could be drastic and uncertain.

The invention is a means of encapsulating the effects of global and/or selective and/or regional selective colour changes into a model designed to carry out a specific colour space transformation to an image, using global and/or selective and/or regional selective colour algorithm, method or process. It can not only be used for correcting any initial deficiencies of an input or output device or an image but can also be easily used to create customised effects which can be used as a filter over any image from a given source.

In this invention the global edits can be incorporated into the AtoB, BtoA transformations, and also into BtoB transformations, but the edits are specified by the user in familiar S space or E space coordinates. This is achieved by modification of the values at grid points in the appropriate MLUTs for a MLUT based system.

Also in this invention the selective and regional selective colour edits are achieved through the AtoB, BtoA, BtoB transformations. By creating selective colour changes in this way, the actual changes in the image, when the data is passed through the transformation, are smoother than if achieved by actually changing the data directly. In addition the changes are made through S or E space coordinates.

Where use of traditional methods is required, this invention allows encapsulation of these colour changes, e.g. RGB/CMYK or any other proprietary colour management method or process, within the ICC or any other standard that uses multidimensional look-up tables. Using the ICC model this invention allows a proprietary method to be represented accurately as a profile or profiles. This is a key advantage because an existing user can get identical results, but with the added bonus of ICC, e.g. flexibility and portability of a once proprietary method to the 'Global' ICC standard. This gives the user more confidence in using the new standard which currently is lacking.

In the case of existing ICC profiles this invention does not attempt to directly manipulate the profile but to capture the essence of it by building a model of its behaviour. It allows manipulation of this model and from it builds a profile to represent the given effect.

This invention will allow working in the chosen colour space, the only proviso being that suitable transformations to represent the ICC profile for a given space representation are required.

The main advantages of this invention are: simplicity, wider scope, flexibility, fine control, accuracy, certainty of the final result and familiarity. These qualities produce consistent results time and again.

This invention cannot do anything about the initial assumptions, but, if presented with an ICC profile, it will model its behaviour and allow manipulation of it. This enables subsequent colour corrections of the profile to be handled more accurately than was the case hitherto by allowing the user to model the subsequent result in a multidimensional LUT which can have a finer mesh of grid points. This gives the user the flexibility of producing a profile with a better precision and accuracy.

You can now create a more sensitive profile, you can contract or expand the original profile. The current editing methods can be fully exploited because the information is not restricted to the finite number of grid points used to represent the original profile.

The simplicity arises from the fact that the whole process is just a sequence of operations involving colour space transformations and colour editing algorithms being applied to grid points of a multidimensional LUT. There are no complex interactions or decisions involved. Using this approach quite complex methods or processes can be represented quickly and easily as profiles.

The scope of this invention is not restricted to the ICC colour model but can be incorporated into any colour management system that uses multidimensional Look-up tables or transformations to produce consistent colours across a variety of reproduction devices.

Using the traditional proprietary method you can control the colour changes to a very precise manner whereas with profiles only the grid points are changed other colour being interpolated so you cannot make a precise change. Now using this invention you still get the fine control of the traditional method but having the flexibility of producing profiles with few as 9 or as many as 65 grid points, the effect of the change could be as coarse or as fine as you want. The ability to have a fine degree of control of the colour changes means that there is much less room for uncertainty in the end result.

In this invention the user is not forced to work with a theoretical colour space but is allowed to work in a practical colour space of his choice with which he is familiar.

The same ideas can be applied in a non-ICC environment where a similar colour management process could make use of multidimensional lookup tables, e.g. for a RIP or device driver.

The methods used in producing the various look-up tables used in the colour management system of the present invention can be described, mathematically, as follows:

Methods

For the ease of description the term MLUT in this context is used to mean a transformation. This can be a multii dimensional look up table or retained as a mathematical transformation. The term grid point is a reference point in a colour space see original definition.

Creating an AtoB which performs a global edit in S space:
For each S grid point G in a MLUT, the corresponding value in I space (IVALUE) is given by:

$$IVALUE=STRANS(SEDIT(G))$$

The IVALUE is entered into the location G in the MLUT.

Creating a BtoA which performs a global edit in E space:
For each I grid point G in a MLUT, the corresponding value in E space (EVALUE) is given by:

$$EVALUE=EEDIT(ETRANS(G))$$

The EVALUE is entered into the location G in the MLUT.

Editing an existing AtoB to include a global edit in S space:
For each S grid point G in a MLUT of a new AtoB:

$$IVALUE=STRANS(SEDIT(STRANS^{-1}(AtoB(G))))$$

The IVALUE is entered into the location G in the MLUT.

Editing an existing BtoA to include a global edit in E space:
For each I grid point G in a MLUT of a new BtoA:

$$EVALUE=EEDIT(BtoA(G))$$

The EVALUE is entered into the location G in the MLUT.

Creating a BtoB using S edits:
For each I space grid point G of a MLUT:

$$IVALUE=STRANS(SEDIT(STRANS^{-1}(G)))$$

The value IVALUE is entered into the location G in the MLUT

Creating a BtoB using E edits:
For each I space grid point G of a MLUT:

$$IVALUE=ETRANS^{-1}(EEDIT(ETRANS(G)))$$

The value IVALUE is entered into the location G in the MLUT

Editing an existing BtoB using S edits:
For each I space grid point G of the MLUT of a new BtoB:

$$IVALUE=STRANS(SEDIT(STRANS^{-1}(BtoB(G))))$$

The value IVALUE is entered into the location G in the MLUT

Editing an existing BtoB using E edits::
For each I space grid point G of the MLUT of a new BtoB:

$$IVALUE=ETRANS^{-1}(EEDIT(ETRANS(BtoB(G))))$$

The value IVALUE is entered into the location G in the MLUT

Applying Selective Colour Edits in S space:
The process SSELECT chooses which S grid points of the AtoB are to be adjusted according to user/process selection of a colour from an image together with the desired spread of colour. The process then adjusts the grid point value accordingly, i.e. G'=G+Δ

The process SSELECT is:
A specific colour is selected from the S space and a desired vector change (Δ) to apply to this colour is also selected;
A virtual box (V) is created around the selected colour (e.g.±2% on each channel—the dimension to be determined by the user/process); for a wider band of selected colour, the box (V) should be enlarged to cover the range.
For each grid point G which lies inside the virtual box the vector change Δ is applied.

Expressing the method using the notation used above, to create a new AtoB, for each S grid point G in the MLUT:
if the grid point falls within the virtual box (V)

IVALUE=STRANS(SSELECT(G))

otherwise

IVALUE=STRANS(G)

and to edit an existing AtoB, for each S grid point G in the MLUT:
if the grid point falls within the virtual box (V)

IVALUE=STRANS(SSELECT(STRANS$^{-1}$(AtoB(G))))

Otherwise

IVALUE=STRANS(STRANS$^{-1}$(AtoB(G)))

(Note: STRANS$^{-1}$ not necessarily the inverse of STRANS.)

In either case, the IVALUE is entered into the location G in the MLUT.

Applying Selective Colour Edits in E space Edits:

The process ESELECT chooses which I grid points of the BtoA should have their EValues adjusted by searching the E space values in the MLUT which lie within the selected colour and its desired spread of colour. The process then adjusts the EValues accordingly i.e. EValue=EValue+Δ

The process ESELECT is:
A specific colour is selected from the E space and a desired vector change (Δ) to apply to this colour;
A virtual box (V) is created around the selected colour (e.g.±2% on each channel—the dimension to be determined by the user/process)
For each Evalue which lies inside the virtual box the vector change Δ is applied.

Expressing this in the notation used above, for each I grid point G in the MLUT:
To create a new BtoA
if the grid point falls within the virtual box (V)

EVALUE=ESELECT(ETRANS(G))

otherwise

EVALUE=ETRANS((G))

To edit an existing BtoA
if the grid point falls within the virtual box (V)

EVALUE=ESELECT(BtoA(G))

otherwise

EVALUE=BtoA(G)

The value EVALUE is entered into the location G in the MLUT.

Applying Selective Colour Edits in I space using S space:

The process ISELECT chooses which I grid points of the BtoB are to be adjusted according to user/process selection of a colour from an image together with the desired spread of colour in S space. The process then adjusts the grid point value accordingly, i.e. G'=G+Δ

The process ISELECT is:
A specific colour C is selected from the S space and a desired vector change (Δ) to apply to this colour.
Transform to I space:

$C_I$=STRANS(C)

New colour $C'_I$=STRANS(C+Δ)

$Δ_I$=$C'_I$−$C_I$

A virtual box (V) is created around the selected colour $C_I$ (e.g.±2% on each channel); for a wider band of selected colour, the box (V) should be enlarged to cover the range.
Search all IVALUES located at grid point of MLUT, locate those that lie within virtual box V and adjust by $Δ_I$.

Thus, for each I grid point G in the MLUT:
To create a new BtoB:
if the grid point falls within the virtual box (V)

IVALUE=ISELECT(G)

otherwise

IVALUE=(G)

To edit an existing BtoB:
if the grid point falls within the virtual box

IVALUE=ISELECT(BtoB(G))

otherwise

IVALUE=BtoB(G)

The IVALUE is entered into the location G in the MLUT.

Applying Selective Colour Edits in I space using E space:

The process ISELECT chooses which I grid points of the BtoB are to be adjusted according to user/process selection of a colour from an image together with the desired spread of colour in S space. The process then adjusts the grid point value accordingly, i.e. G'=G+Δ

The process ISELECT is:
A specific colour C is selected from the E space and a desired vector change (Δ) to apply to this colour.
Transform to I space:

$C_I$=ETRANS(C)

New colour $C'_I$=ETRANS(C+Δ)

$Δ_I$=$C'_I$−$C_I$

A virtual box (V) is created around the selected colour $C_I$(e.g.±2% on each channel); for a wider band of selected colour, the box (V) should be enlarged to cover the range.
Search all IVALUES located at grid point of MLUT, locate those that lie within virtual box V and adjust by $Δ_I$.

Thus, for each I grid point G in the MLUT:
To create a new BtoB:
if the grid point falls within the virtual box (V)

IVALUE=ISELECT(G)

otherwise

IVALUE=(G)

To edit an existing BtoB:
if the grid point falls within the virtual box

IVALUE=ISELECT($BtoB(G)$)

otherwise

IVALUE=$BtoB(G)$

The IVALUE is entered into the location G in the MLUT.

Regional selective colour edits or corrections are achieved using the selective colour editing techniques discussed above in relation to each colour contained within a part of an image identified by the user. The colour editing technique is applied to every occurrence of the colours so selected across the complete image and not just the selected area.

To summarize, the invention is a means of encapsulating the effects of global and/or selective and/or regional selective colour changes into a transformation which can be multidimensional LUT, designed to carryout a specific colour space transformation to an image, using global and or selective colour algorithm, method or process.

The invention allows global and or selective changes to be made to the colours of a digital image in an environment which is familiar to a typical user (e.g. in RGB or CMYK colour spaces) while also achieving the speed and standardisation advantages of the ICC approach.

An important advantage of the method is that it allows the results of the editing process to be accurately represented by the transformation so that the user is assured of the appearance of the final image. Another advantage is the preservation of the original image data since the information containing the edits is contained in an attached file.

Also this invention enables the encapsulation of existing RGB/CMYK or any other proprietary colour management method or process to the ICC or any other standard that uses multidimensional Look-up tables or transformations. In the case of ICC this invention allows a proprietary method to be represented accurately as a profile or profiles. This is a key advantage because an existing 'User' can get indentical result in ICC, as to what he was getting before, but with the added bonus of ICC.e.g. flexibility and portability of a once proprietary method to the 'Global ICC standard. This gives the user more confidence in using the new standard which currently is lacking.

The invention can be incorporated into a colour management system used to produce consistent colours across a variety of reproduction devices.

Accuracy of image representation is very important as the final output image must look as it is intended to do, both on the monitor display and in the printed version, and this accuracy is a feature of the invention.

The key components of the invention are:
incorporating global editing processes into the creation and editing of transformations (profiles) used in a colour management process,
a method of achieving selective colour changes in an image and also incorporating them into the relevant transformations.

Traditionally, all the image data is passed through some colour correcting process involving both single channel and multi-channel corrections, producing a global change in the image.

In this invention, the same global editing process can be used in the building of a multidimensional lookup table by passing its grid points through the colour correction process and using the relevant algorithm for colour space conversion. The multidimensional lookup table thus contains the necessary information for modifying the image data. When image data is passed through such a table, the modifications are accurately reflected in the displayed or printed image.

The global editing processes will often be carried out in RGB or CMYK colour spaces since these are currently the most familiar, although the invention can be used for other colour spaces by substituting a different algorithm for the colour space conversion.

In the ICC world there are basically three transformations needed: in this document they are denoted by AtoB (input space to profile connection space), BtoA (profile connection space to output space), and BtoB (profile connection space to profile connection space), and these transformations are either to be created or, if they already exist, to be edited. This invention allows all these to be done through the appropriate use and mixture of editing process and colour space conversion algorithms.

When creating an AtoB transformation to incorporate global edits the image data is already defined in start space coordinates so that the edits can be carried out before applying an algorithm to convert from start space to intermediate space coordinates.

When a new AtoB is required to be made to incorporate the effects of existing AtoB transformation the values which need changing are in an intermediate I space coordinates whereas the editing process operates on start space values. Therefore the I space values are first transformed by a colour space transformation algorithm to S space, then edited and finally transformed back to I space of a new AtoB.

In the case of BtoA transformations the reference data has already been converted to E space either by an algorithm or an existing BtoA so that the global editing process can take place in E space at the end of the sequence.

For BtoB transformations both the input and output values are in I space coordinates so that a colour space transformation algorithm is needed to convert to S space or to E space before the appropriate editing process can be applied. The inverse algorithm finally takes the values back to I space.

The same ideas can be applied in a non-ICC environment where a similar colour management process could make use of multidimensional lookup tables or transformations, e. g. for a RIP or device driver.

The user may wish to identify a particular colour in the image and give it a new value (usually all colours in the image which fall in a narrow band around the selected colour will be changed in the same way). Traditionally this change is achieved by changing the image data. In this invention, the method of building the transformation or multidimensional lookup tables is adapted and used to achieve the desired effect.

When selective colour edits are used instead of global colour edits the pattern and sequence of colour space transformations remains the same as described above for global edits, the difference lies only in the editing process.

The user selects the colour to be changed and the amount of change (resulting in a new colour) and only a small range of colours in the neighbourhood of the selected colour will be affected by the change. This neighbourhood is in colour space and not the physical neighbourhood of the actual image (which could contain many colours that are not due to be affected). The methods in this invention create virtual envelope, around the selected colour, which represent those colours to be modified and grid points (or grid point values) which are contained in such a virtual envelope are adjusted according to the amount specified by the user. This editing process has to be interwoven with appropriate colour space transformation algorithms depending on the task.

Rather than select a specific colour as in the selective colour correction technique, a user may identify a region of an image containing several colours, and the editing technique applied, across the complete image, to all of the colours contained within the selected region. Such a technique is referred to as a regional selective colour correction technique. The technique is very similar to the selective colour correction technique, the main difference being in how the colours to be edited are identified.

It will be appreciated that the methods described hereinbefore, as they are intended to be used with computers to manage the transmission of data relating to colour images between difference pieces of hardware, the invention will, in practise, be embodied within a computer program.

The invention claimed is:

1. A method of deriving a colour space transformation lookup table comprising applying an editing technique to data and applying a conversion technique to data, wherein the editing technique is applied to data in a colour space selected by the user, referred to as Start space (S space) or End space (E space), by encapsulating the effects of global or selective colour changes in Start space or End space into a model designed to carry out a specific colour space transformation to an image, using a global or selective colour algorithm, and using the model to incorporate the global or selective edits into A to B, B to A and B to B transformations, where edits are specified by the user in S space or E space coordinates, by constructing a multidimensional lookup table wherein a plurality of entries contain the transformation values for equally spaced S space or E space coordinates which apply the transformation to the original image data, where an A to B transformation converts data from S space to an intermediate space (I space), a B to A transformation converts data from an I space to E space, and B to B transformation converts data from I space to I space.

* * * * *